No. 772,819. PATENTED OCT. 18, 1904.
M. W. PALMER.
BEET PULLER.
APPLICATION FILED JUNE 11, 1903. RENEWED MAY 19, 1904.
NO MODEL. 2 SHEETS—SHEET 1.

WITNESSES:
John T. Schrott
F. C. Gibson

INVENTOR
Merritt W. Palmer
BY
Fred G. Dieterich
ATTORNEYS

No. 772,819. PATENTED OCT. 18, 1904.
M. W. PALMER.
BEET PULLER.
APPLICATION FILED JUNE 11, 1903. RENEWED MAY 19, 1904.
NO MODEL. 2 SHEETS—SHEET 2.

WITNESSES:
John T. Schrott
F. C. Gibson.

INVENTOR
Merritt W. Palmer.
BY
Fred G. Dieterich
ATTORNEYS

No. 772,819.                                                   Patented October 18, 1904.

UNITED STATES PATENT OFFICE.

MERRITT WESLEY PALMER, OF HAMILTON, MICHIGAN.

BEET-PULLER.

SPECIFICATION forming part of Letters Patent No. 772,819, dated October 18, 1904.

Application filed June 11, 1903. Renewed May 19, 1904. Serial No. 208,673. (No model.)

*To all whom it may concern:*

Be it known that I, MERRITT WESLEY PALMER, residing at Hamilton, in the county of Allegan and State of Michigan, have invented certain new and useful Improvements in Beet-Pullers, of which the following is a specification.

My present invention, which relates to improvements in that type of beet plows or pullers having runners adapted to enter the soil under and to straddle the beet and pull it bodily upward upon lifter-arms, more particularly seeks to improve the construction of beet-puller or plow disclosed in my Patent No. 699,561, dated May 6, 1902, whereby to render the operation of the said puller or plow the more effective and positive, the manufacture of the same more economical, and the cooperative arrangement of the several parts the more durable and compact.

My present invention, while embodying the same generic arrangement of the runners, the standards, and the horizontal frame shown in my patent aforesaid, also involves an improved construction of the runners or plow members whereby the same may be conveniently and economically made of cast metal and with seats to provide for a smooth and rigid attachment thereof to the standards and for more effectively packing the soil against the beet during the operation of pulling or forcing the same up on the lifter-fingers and without danger of bruising or jamming the roots of the beet as the same is carried up on the said fingers or arms high enough to cause the dirt to drop off or separate from the roots and leave the beet dirt free on the ends of the said arms before it is finally dropped. In my present invention the plows or runners are also specially designed for a convenient and effective attachment of supplemental shear or cutter blades for penetrating the soil as the plows or runners enter toward and under the beets and improved construction of slip-point, together with other details of construction and combination of parts hereinafter fully described and claimed, being also included.

Figure 1:
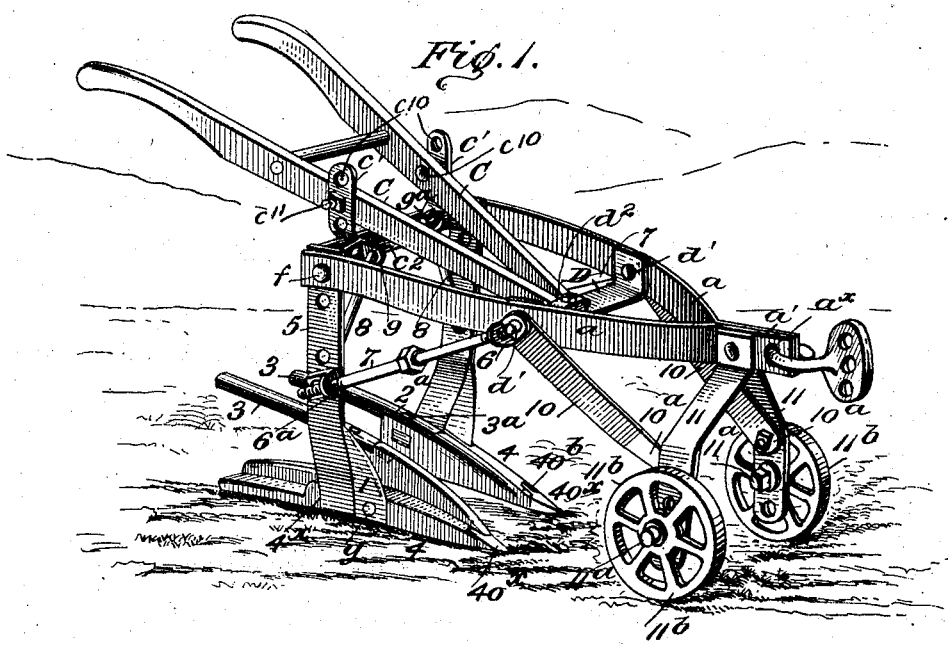
Figure 2:
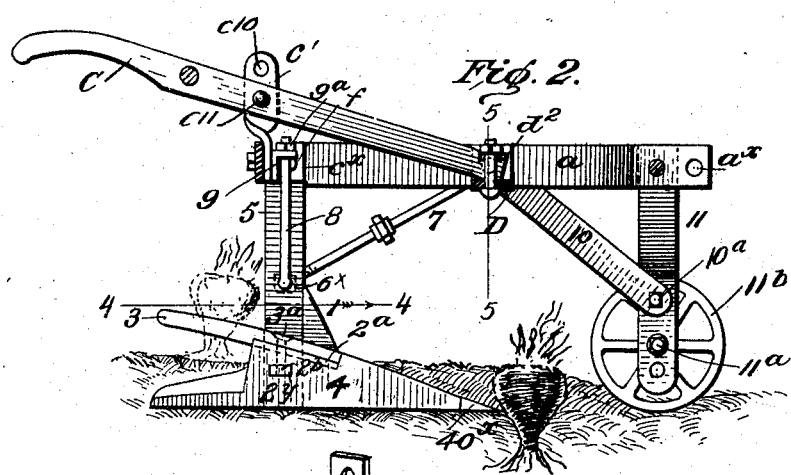
Figure 3:
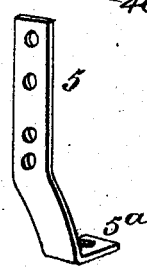
Figure 3:
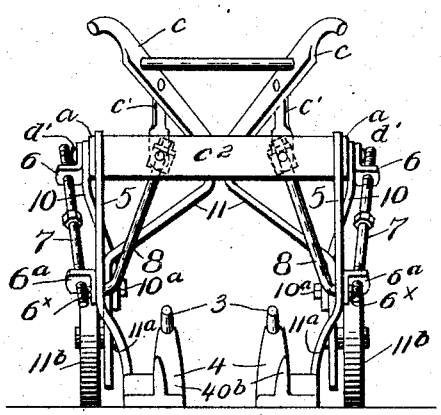
Figure 4:
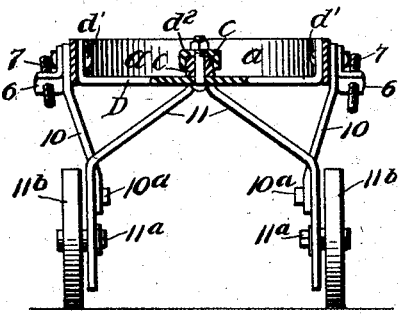
Figure 5:
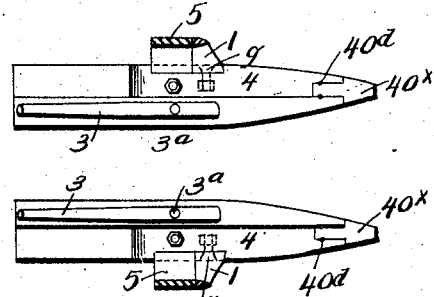
Figure 7:
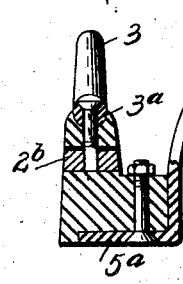
Figure 6:
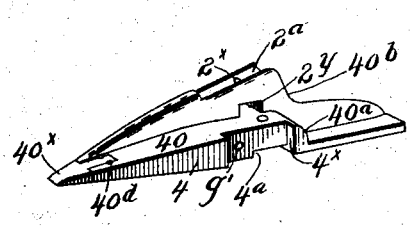
Figure 9:
Figure 10:
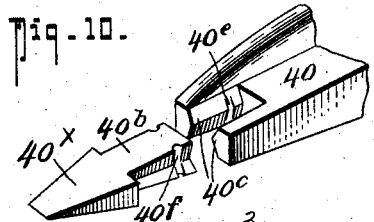
Figure 11:

Referring now to the accompanying drawings, Figure 1 is a perspective view of my improved beet puller or plow. Fig. 2 is a longitudinal section thereof, illustrating the manner in which the runners raise the beet, the manner in which the same passes off the lifter-arms being indicated in dotted lines. Fig. 3 is a rear elevation of the same. Fig. 4 is a transverse section thereof on the line 4 4 of Fig. 2 looking in the direction of the arrow. Fig. 5 is a horizontal section of the same on the line 5 5 of Fig. 2. Fig. 6 is a detail perspective view of one of the runner-castings with the lift-fingers separated therefrom. Fig. 7 is a detail cross-section of the runner and illustrates the manner in which the foot of the standard and the lifter arm or rod are secured thereto. Fig. 8 is a detail perspective view of one of the standards. Fig. 9 is a similar view of one of the shear or cutter members. Fig. 10 is a detail view of the front end of one of the plows or runners with the slip-point shown detached. Fig. 11 is a detail cross-section of the plow.

In my present construction the horizontal or draft frame is substantially V-shaped in plan view and consists of the vertically-set side bars $a$ $a$, whose front ends lap, as at $a'$, are apertured at $a^x$ to receive a pull-clevis or draft-chain, and also apertured for the convenient attachment thereto of the arched standard or frame bars 11 11, whose lower ends have a series of vertically-disposed apertures to receive the stud spindles or axles $11^a$ of the gage-wheels $11^b$, as clearly shown in Fig. 1, and each of said bars also has an aperture for connecting the lower ends $10^a$ of rearwardly-extending brace-bars 10, whose upper ends are fastened to the side bars $a$ by the bolts $d'$, that secure the cross-bar D, to which the front end of the rearwardly-extending and divergingly-disposed handles C C are secured by the clip member $d^2$. The handles C C have vertical adjustment upon and are adapted to be made fast to the apertured brackets $c'$ $c'$, which extend vertically from a rear cross-bar $c^2$ held in the vertical plane of the side bars $a$ $a$ and having its angle ends $c^x$ made fast to the rear ends of the said side bars $a$ $a$ by the bolts $f$ $f$, that adjustably secure the upper end of the standards 5 5, and the said bar $c^2$ has a pair of apertured ears 9 9, the purpose of which will be presently explained. The brackets $c'$ $c'$ have apertures $c^{10} c^{10}$, through which the bolts $c^{11} c^{11}$ are adapted to pass, and these bolts also pass through apertures in the handles C, so that the handles can be readily adjusted with the bolts in either of the apertures $c^{10}$, as will be clearly understood by reference to Figs. 1 and 2 of the drawings.

In my present construction of beet-puller the standards 5 extend vertically downward a part of their length and then bend inwardly, and their lower ends have a square bend to form short horizontal shoes $5^a$, adapted to enter countersunk seats $4^a$ in the under side of the solid base portions of the runners 4, whose outer edges are also cut out, as at $4^x$, whereby the outer face of the lower ends of the standards can be fitted flush with the outer edges of the runners, as shown.

The standards 5 in my present structure are not sharpened, but have flat front edges, and at the lower or rearwardly-bent portion thereof are fixedly held supplemental cutter or shear blades 1 1, bent to conform to the shape of the lower ends of the standards 5, and the rear flat edges of the said blades 1 lie flatwise against the flat front edges of the standards 5. The front edges of the members 1 1 are sharpened from the runner to their upper extremity, and the said members are cut on a taper whereby to produce, as it were, a slanting shearing edge, which in the practical construction is about seven inches long, more or less.

Each shear blade or member has its lower or wide portion held within the seat $4^x$ in the runner edge and is made fast by a countersunk bolt $g$, which enters a socket $g'$ in the solid part of the runner and engages a nut $g^2$ in the cored portion $4^c$ of the said solid portion of the runner, as clearly shown in Fig. 11. Each runner 4 is cast with a vertical flange rounded at its upper edge, and at the rear end the said flange is formed with a concaved seat $2^a$, adapted to receive an iron rod 3, which is made fast to the runner-body by the bolt $3^a$, whose head fits the countersunk seat in the upper face of the rod 3 and which enters a vertical aperture $2^x$ in the flange 2, that merges with a cored recess $2^y$, in which fits a nut or bur $2^b$, with which the bolt $3^a$ engages. The rods 3 extend rearwardly on an upward curve and form the equivalents of the lifter-arms shown in my patent aforesaid.

Upon each standard 5 is mounted an ear $6^a$ $6^a$, and the ears $6^a$ coöperate with the ears 6 6, mounted on the side bars $a$ $a$ and secured by the bolts $d'$, that secure the cross-bar D, and the said ears 6 and $6^a$ have right and left threaded apertures to accommodate the right and left threaded ends of the adjusting-rods 7 7, whereby the turning of the said rods 7 in opposite directions will set the runners at any draft or angle as the condition of the soil may make desirable.

The standards 5 5 are braced and adjusted laterally by the transversely-inclined brace-rods 8, whose upper ends pass through the apertured ears 9 9 on the cross-bars $c^2$, and said ends are threaded to receive the nuts $9^a$, and the lower ends of the said rods 8 are bolted to the standards 5, said lower ends being bent at an angle, whereby to engage the registering apertures in the standards 5 and the ears $6^a$ and to receive the nuts $6^x$, which also secure the ears $6^a$, as shown, it being understood that by securing the members 8 in the manner stated the runners can be spread or drawn together to suit the soil.

By referring now to Fig. 5 it will be noticed that the opposing inner faces of the runners have a substantially parallel relation from the rear end to a point about in line with the lower end of the cutter's edge, from which point they gradually diverge, whereby the runners will readily penetrate the soil and straddle the lower end of the beet and at the same time pack the soil at each side of the beet under the main bulge or body thereof, and as the pressure of the earth against the beet is constantly upward the beet is lifted up by the pressure of the soil against it without breaking or bruising the beet as the packed soil rises with it and backs up over the lifter-arms above the surface of the earth, (see Fig. 2,) it being apparent that when the beet with the soil packed around it moves over the arms the soil loosens from the beet and leaves the same free on top of the ground ready to be gathered. To facilitate the packing of the earth upward and sideward against the beet-body, the horizontal portion of the runners curves upwardly from the penetrating end to a point about midway the arms 3, at which point the part 40 terminates in a pendent shoulder $40^a$, that ends at the reduced or thinned rear end of the horizontal portion of the runner, and at the rear end the vertical or arm-carrying portion of the runner is also reduced, as at $40^b$, such reducing of the rear end of the runner-body being provided to give free space under the rear ends of the arms for the proper dropping of the dirt from the roots or body of the beet as it is carried up over the rear ends of the arm or rods 3.

The front or penetrating end of the plow or runner is in the nature of a slip-point $40^x$, which has a rearwardly-extending shank $40^b$, whose opposite edges have dovetailed grooves (see Fig. 10) to engage the dovetailed ribs $40^c$ in the sides of the shank-receiving slot in the runner member 40, in which it is firmly held by a bolt $40^d$, that engages the coincident grooves $40^e$ $40^f$ in ribs $40^c$ and the shank $40^b$.

By providing a slip-point constructed as shown when the point is worn the same can be readily reversed to bring its under side uppermost, and thereby present a new point, thus materially increasing the life of the runner or plows.

The runners are spread by loosening the nuts or burs 9ª and tightening the jam-nuts 9ᵇ, and the vertical tilt or depth of the runners is regulated by properly adjusting the rods 7 7.

From the foregoing description, taken in connection with the accompanying drawings, it is believed the complete construction, the manner of operation, and the advantages of my invention will be readily apparent.

Having thus described my invention, what I claim, and desire to secure by Letters Patent, is—

1. In a beet-pulling machine of the character described, the combination with the draft-frame, a pair of separated plow-standards pendent from the rear end of said frame, and a plow or runner mounted one on the lower end of each standard; of a shear or cutting member secured to the outer edge of each plow projected in the vertical plane of the standards and having its rear edge abutting the front edges of the standards.

2. In a beet-puller of the character described, the combination with the draft-frame, the standards pendent from the rear end thereof, and the plows detachably mounted on the lower end of the standards, said plows having integral vertical flanges whose rear end merges with rearwardly-extending fingers; of a shear or cutter for each standard detachably secured to the outer edge of the plows with their rear edge held in abutment with the front edge of the standards, said cutter members tapering rearwardly from the point where they are attached to the plow, to their upper end, as set forth.

3. In a beet-puller as described, the combination with the draft-frame, the standards 5 pivotally and adjustably secured to the rear ends thereof, plows or runners on the lower ends of the standards, the ears 6ª on the standards, the ears 6 on the draft-frame, said ears 6ª and 6 having right and left threaded apertures respectively, and the rods 7 having right and left threaded ends for engaging the said ears 6 6ª, for the purposes described.

4. In a beet-puller of the character described; in combination with the draft-frame, the standards and the plows arranged substantially as shown, of a cutter comprising a tapering member secured to the plow and held in the vertical plane of the front edge of each standard, said cutter having a front shear-face and a flat rear edge whereby to abut the front edge of the standards, for the purposes described.

5. In a beet-puller as described, in combination with the standards 5 and the draft-frame, said standards having vertical adjustment on and secured to the rear ends of the said frame; of the plows or runners 4 4 each having a countersunk seat in the outer edge and bottom, to receive the lower ends of the standards, said plows having integral vertically-projected flanges extending part of their length rearwardly, said flanges tapering downwardly to the plow-point and having seats in their rear upper end, rods detachably mounted in the said seats and extending rearwardly in the plane of the vertical flanges, and means for bracing the plow-standards, for the purposes described.

6. In a beet-puller as described, a runner or plow consisting of a horizontal portion whose upper face curves upwardly from the point to near the rear end, a vertical portion adapted to press the soil inwardly, and an arm rearwardly extended from the upper edge of the said vertical portion, as set forth.

7. In a beet-puller as described; a plow or runner having a longitudinal socket in its penetrating end the side walls of which have dovetailed ribs, a reversible point having a shank formed with dovetailed grooves to engage the dovetailed ribs in the aforesaid socket, said shank and ribs having notches adapted to aline and a key for engaging the alined notches of the shank and ribs, for the purposes described.

MERRITT WESLEY PALMER.

Witnesses:
I. M. TAPPEN,
FRANK DALTON.